UNITED STATES PATENT OFFICE.

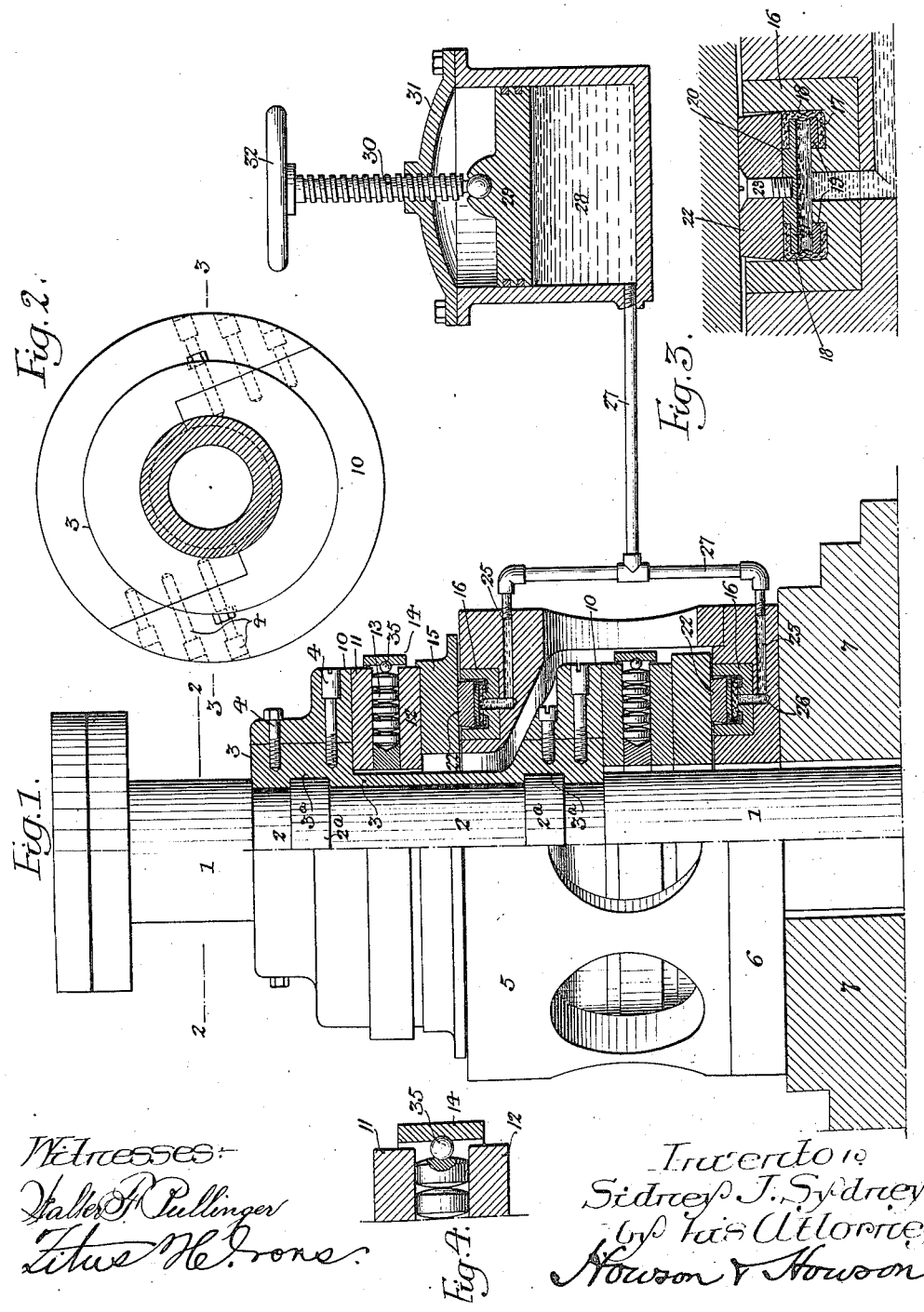

SIDNEY J. SYDNEY, OF PHILADELPHIA, PENNSYLVANIA.

BEARING.

1,169,206.

Specification of Letters Patent.

Patented Jan. 25, 1916.

Application filed June 12, 1908. Serial No. 438,123.

*To all whom it may concern:*

Be it known that I, SIDNEY J. SYDNEY, a citizen of the United States, residing in Philadelphia, Pennsylvania, have invented certain Improvements in Bearings, of which the following is a specification.

My invention relates to step or thrust bearings, and the object of my invention is to provide bearings for the shafting of heavy machinery, notably turbine generators, which shall be as nearly frictionless as possible and self-balancing, the means for this latter purpose being the use of a liquid cushion, which may be oil or other suitable body. These and other features of my invention are more fully described hereinafter, reference being had to the accompanying drawings, in which,—

Figure 1, is a view of one form of bearing made in accordance with my invention, one-half of which is shown in section on the line 3—3, Fig. 2; Fig. 2, is a plan view of the structure, partly in section on the line 2—2, Fig. 1; Fig. 3, is an enlarged sectional view illustrating a detail of my invention; and Fig. 4, is a view illustrating a detail of the structure shown in Fig. 1.

The shaft, in this instance vertically disposed, is indicated at 1, and is reduced at the points 2 for the engagement of a sleeve or collar 3 having annular grooves 3ª to fit the ribs 2ª of the shaft. This sleeve or collar is in two sections, as clearly shown in the plan view, so as to be readily applied to the shaft; the sections being suitably secured by bolts, screws or other means indicated at 4. Surrounding the shaft and the collar before referred to, is a supporting or base member made in two parts, indicated at 5 and 6; the part 6 resting upon a suitable base 7, while the part 5 rests upon the part 6. Interiorly, the part 5 is of such contour as to accommodate the lower portion of the collar or sleeve 3. The collar in this present arrangement has projecting annular portions 10 which, of course, rotate with the shaft and rest upon roller bearings which, in the present instance are composed of disk plates 11 and 12, between which a series of small rollers 13 are arranged concentrically and confined in place by a suitable collar 14 so as to overcome their tendency to leave the bearing plates. These roller bearings, of which there are two in the present instance, rest upon disks 15; the upper one of which is mounted upon the top of the member 5 of the supporting or base structure, and these disks 15 are supported by the fluid body. The means for accomplishing this are shown in detail in Fig. 3, and in each instance consist of a ring 16 substantially U-shaped in cross section, let into the top of the member 5. This ring is recessed adjacent the inner and outer walls as shown at 17, and fixed in these recesses are bands of leather 18 or other suitable material which may be held in place by rings 19. A cover ring 20 is then placed between the bands of leather; such cover ring having recessed edges 21, and the upper edges of the leather bands are turned so as to engage these recessed portions in the manner shown in Fig. 3. Closing the space between this cover ring 20 and the top of the U-shaped ring, is a ring 22, having slightly beveled sides so as to be incapable of binding in its seat, and this cover ring 20 and the upper one receiving the leather bands are secured together by screws 23 in the manner shown. The structure just described is duplicated in the member 6, for which further description is thought unnecessary. To supply oil to these parts of the structure, the portions 5 and 6 are bored as shown at 25, in line with apertures 26 in the bottom of the U-shaped rings 16, and connecting these bores is a pipe 27 which leads from a cylindrical vessel 28 containing a body of oil or other suitable liquid and having a piston 29 for forcing said liquid to the hollow spaces of the U-shaped rings 16. This piston is carried by a rod 30 passing through a threaded cap 31 over the cylinder containing the liquid, and pressure is maintained by turning a hand wheel 32 connected to the piston rod to force the oil or other liquid to the spaces of the bearing to lift the rings 22 and by this means balance the bearings supported thereby. This arrangement for forcing the oil or other liquid makes possible the use of a plurality of bearings by dividing the load.

The roller bearings employed are of a type well known, and the rollers are confined in place by a series of small balls 35 interposed between the outer series of the same and the external collar 14; the outer rollers and collar being recessed to receive the balls.

The bearing which I have devised is extremely simple in construction and mode of operation, and insures the proper balancing of the shaft.

I claim:

1. The combination of a vertically disposed shaft having annular grooves, a plurality of supporting flanges secured to said shaft adjacent its grooves, a plurality of anti-friction bearings upon which said flanges rest comprising rollers concentrically arranged and disposed between relatively fixed plates, a sectional base, part of which is in the form of a hollow shell encircling one of said supporting flanges and the bearing therefor, a plurality of movable rings supported by said base, disks interposed between said rings and the bearings upon which the latter rest, said base being provided with circular recesses to receive said rings, flexible material connected to said rings and the base and providing fluid tight chambers having flexible walls beneath said rings, and means for directing fluid under pressure to said chambers to act upon said rings.

2. In a thrust bearing, the combination of a shaft, a collar thereon provided with a thrust face, a thrust abutment, an annular pressure-actuated diaphragm surrounding the shaft and mounted on said abutment, load-carrying means supported by the diaphragm, and rollers between said means and said collar.

3. In a thrust bearing, the combination of a vertical shaft, a collar thereon provided with a thrust face, a relatively fixed thrust abutment, an annular pressure-actuated flexibly mounted diaphragm surrounding the shaft and supported by the thrust abutment and giving support to the thrust face, a plurality of disk plates interposed between the diaphragm and said thrust face, and rollers mounted between a pair of said plates.

4. In a thrust bearing, the combination of a shaft, a collar thereon provided with a thrust face, a relatively fixed thrust abutment, and an annular pressure actuated flexibly mounted diaphragm surrounding the shaft and supported by the thrust abutment and giving support to the thrust face, and rollers interposed between said diaphragm and said collar.

5. In a thrust bearing, the combination of a shaft, a collar thereon provided with a thrust face, a thrust abutment, an annular pressure actuated diaphragm surrounding the shaft and supported by the thrust abutment, a plurality of annular plates mounted on said diaphragm, one of which is a bearing plate, and rolling elements interposed between said bearing plate and the thrust face of the collar.

6. In a bearing, the combination of a plurality of collars having load sustaining faces with a plurality of fixed abutments therefor, pressure actuated supporting diaphragms between said faces and abutments, a plurality of load carrying means supported by said diaphragms, rollers between said means and the collars, and means for supplying and controlling the pressure to said supporting diaphragms.

In testimony whereof, I have signed my name to this specification, in the presence of two subscribing witnesses.

SIDNEY J. SYDNEY.

Witnesses:
Wm. E. Shupe,
Wm. A. Barr.